United States Patent
Yoo et al.

(10) Patent No.: US 9,573,219 B2
(45) Date of Patent: Feb. 21, 2017

(54) WELDING METHOD FOR SHELL AND TUBE

(71) Applicant: SEWON CELLONTECH CO.,LTD., Seoul (KR)

(72) Inventors: Yong Hyun Yoo, Changwon-si (KR); Kang Jun Lee, Changwon-si (KR); Shin Ghu Park, Changwon-si (KR); Jeong Cheol Ju, Changwon-si (KR); Jeong Seok Oh, Changwon-si (KR); You Jin Park, Changwon-si (KR)

(73) Assignee: SEWON CELLONTECH CO., LTD. (KR)

( * ) Notice: Subject to any disclaimer, the term of this patent is extended or adjusted under 35 U.S.C. 154(b) by 0 days.

(21) Appl. No.: 15/082,099

(22) Filed: Mar. 28, 2016

(65) Prior Publication Data
US 2016/0288240 A1    Oct. 6, 2016

(30) Foreign Application Priority Data
Apr. 3, 2015    (KR) .................. 10-2015-0047762

(51) Int. Cl.
   *B23K 11/093* (2006.01)
(52) U.S. Cl.
   CPC ........ *B23K 11/0935* (2013.01); *B23K 2201/14* (2013.01)
(58) Field of Classification Search
   CPC . B23K 2201/14; B23K 9/0052; B23K 9/0026; B23K 9/0284
   See application file for complete search history.

(56) References Cited

U.S. PATENT DOCUMENTS

| | | | | |
|---|---|---|---|---|
| 3,496,629 | A | * | 2/1970 | Martucci .................. B23K 1/20 228/168 |
| 2007/0137035 | A1 | * | 6/2007 | Hsieh ...................... B21C 37/22 29/890.03 |
| 2010/0059483 | A1 | * | 3/2010 | Bruck .................. B23K 9/0026 219/60.2 |
| 2013/0175014 | A1 | * | 7/2013 | Hong .................... B23K 9/0052 228/165 |

(Continued)

FOREIGN PATENT DOCUMENTS

| | | |
|---|---|---|
| JP | 2001-187992 A | 7/2001 |
| KR | 10-20130081440 A | 7/2013 |

(Continued)

*Primary Examiner* — Geoffrey S Evans
(74) *Attorney, Agent, or Firm* — Park & Associates IP Law, P.C.

(57) ABSTRACT

A method for welding tubes in a shell and tube heat exchanger, including forming ring-shaped tube sheet grooves on the tube sheet at the shell side, inserting tube joint members into the tube insertion holes of the tube sheet, producing ring wires by cutting a welding wire into pieces and bending the pieces into a ring shape, affixing the ring wire to the outer circumference of one end of the tube, inserting the end of the tube into the tube sheet such that the end of the tube contacts one end of the tube joint member and is located within the recessed distance range of the tube sheet groove, and performing shell side welding by inserting a welding torch into the tube joint member and welding the end of the tube joint member, the end of the tube and the joint part to the tube sheet at the shell side using the ring wire as filler metal.

1 Claim, 9 Drawing Sheets (56) References Cited

U.S. PATENT DOCUMENTS

2015/0086440 A1* 3/2015 Scheerder ............... F28F 9/185
　　　　　　　　　　　　　　　　　　　　　422/201
2015/0354904 A1* 12/2015 Ogumo ................. B23K 26/32
　　　　　　　　　　　　　　　　　　　　　165/181

FOREIGN PATENT DOCUMENTS

| KR | 10-1298703 B1 | 8/2013 |
| KR | 10-1359778 B1 | 2/2014 |

* cited by examiner

WELDING METHOD FOR SHELL AND TUBE

REFERENCE TO RELATED APPLICATIONS

This application claims the priority benefit of Korean Patent Application No. 10-2015-0047762 filed on Apr. 3, 2015, the entire contents of which are incorporated herein by reference.

FIELD OF THE INVENTION

The present invention relates to a shell and tube welding method of a shell and tube heat exchanger.

BACKGROUND OF THE INVENTION

A shell and tube heat exchanger includes two tube sheets and a plurality of tubes connecting the tube sheets and is configured to be enclosed by a cylindrical body, i.e., a shell. The shell and tube heat exchanger is used in various types of heat exchange, such as heating, cooling, condensation, evaporation, etc.

Figure 1:
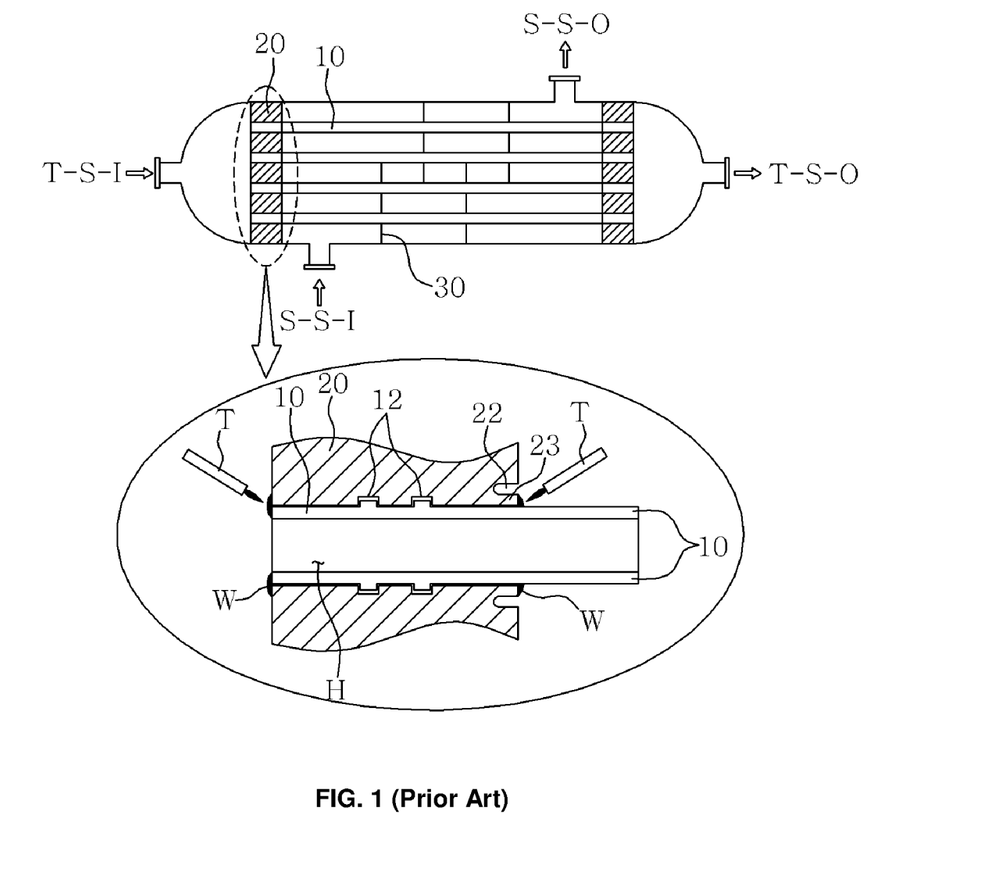
FIG. 1 is a cross-sectional view illustrating a conventional shell and tube welding method.

In general, a shell and tube heat exchanger is configured such that different fluids are introduced into and discharged from a tube side and a shell side and the fluid at the tube side and the fluid at the shell side exchange heat, as exemplarily shown in FIG. 1. As a movement path of the fluid at the shell side, the fluid at the shell side is introduced into a shell side inlet (S-S-I), zigzags through a plurality of baffle plates 30 formed in the shell, and is discharged to the outside through a shell side outlet (S-S-O). The tubes 10 are welded to tube sheets 20 provided at both sides of the shell so as to prevent mixing of the fluid in the tube 10 and the fluid in the shell. As a movement path of the fluid at the tube side, the fluid at the tube side is introduced into a tube side inlet (T-S-I), introduced into the tubes 10 passing through the inside of the shell, exchanges heat with the fluid in the shell, and is then discharged to the outside through a tube side outlet (T-S-O).

Here, in order to prevent mixing of the different fluids at the shell side and at the tube side, the tubes 10 passing through the inside of the shell should be completely isolated from the inside of the shell and, thus, the tubes 10 are welded to two tube sheets 20 symmetrically formed at both sides of the shell to face each other.

As a prior art document (patent document 1), Korean Patent Registration No. 10-1298703 discloses a welding method of the tube sheets 20 and the tubes 20 of the shell and tube heat exchanger. That is, as exemplarily shown in FIG. 1, a plurality of tube insertion holes H is formed on the tube sheets 20, and the tubes 10 are expanded under the condition that the tubes 10 are respectively inserted into the tube insertion holes H of the tube sheets 20, and thus fixed to the tube sheets 20. Thereafter, tube side welding is carried out between the tubes 10 and the tube sheets 20, thereby combining the tubes 10 and the tube sheets 20. Here, tube side welding refers to welding to prevent a fluid introduced into and discharged from the tubes 10 from permeating into gaps between the tubes 10 and the tube sheets 20, and is performed at outer regions (i.e., regions contacting the fluid introduced into and discharged from the tube side) when the tubes 10 and the tube sheets 20 are combined.

Although the tubes 10 are expanded and then tube side welding is carried out, the tube sheets 20 and the tubes 10 at the shell side do not completely contact each other, fine gaps therebetween are generated, and cracks are formed in the tube 10 due to corrosion through the gaps. In order to overcome such a problem, tube grooves 12 and tube sheet grooves 22 are respectively formed on the tube sheets 20. The tube groove 12 receives a designated portion of the tube 10 when the tube 10 is expanded and thus serves to increase combining force, and the tube sheet groove 22 serves to facilitate shell side welding.

The tube groove 12 is formed on the inner surface of the tube insertion hole H of the tube sheet 20 and allows the tube 10 to be more closely combined with the tube sheet 20 when the tube 10 is inserted into the tube insertion hole H and then expanded. Thereafter, shell side welding is carried out. Shell side welding refers to welding to prevent a fluid introduced into the shell side from permeating into gaps between the tubes 10 and the tube sheets 20 so as to prevent generation of cracks in the tube 10 and corrosion of the tube 10 due to the fluid, and is performed at inner regions (i.e., regions contacting the fluid introduced into and discharged from the shell side) when the tubes 10 and the tube sheets 20 are combined. The tube sheet grooves 22 are formed on the inner surfaces of the tube sheets 20 and shell side welding is carried out using a welding torch T. The tube 10, i.e., a base material, is directly welded to a tube sheet lower end joint part 23 at the outside of the tube sheet 20 by the welding torch T.

Here, the reason why the tube sheet grooves 22 are formed on the side surface of the tube sheet 20 is that, during shell side welding, it is not necessary to heat the entirety of the tube sheet 20 but only the tube sheet lower end joint parts 23 formed at the tube sheet grooves 22 may be heated to achieve welding. Since the thickness of the tubes 10 is about 1.5 to 2 mm, if the tube sheet lower end joint parts 23 formed by the tube sheet grooves 22 have the same thickness as the tubes 10, although welding may be carried out by locally heating only the tube sheet lower end joint parts 23 not by heating the entirety of the tube sheet 20, thereby reducing consumption of heat required for welding and thus increasing welding efficiency. Further, the tube sheet groove 22 formed on the side surface of the tube sheet 20 is spaced from the tube insertion hole H, into which the tube 10 is inserted, by a predetermined distance and formed in an arc shape around the tube insertion hole H.

Welding between the tube sheets 20 and the inner sides of the tubes 10 and welding between the tube sheets 20 and outer sides of the tubes 10, i.e., tube side (outer side) welding and shell side (inner side) welding between the tube sheets 20 and the tubes 10, are respectively carried out and, here, any one of tube side (outer side) welding and shell side (inner side) welding may be carried out first.

However, in the prior art document (patent document 1), during shell side welding, the tubes 10 are directly welded to the tube sheet lower end joint parts 23, formed by the tube sheet grooves 22, at the outside of the tube sheet 20 by the welding torch T and, in this case, several tens to hundreds of tubes 10 are welded to the shell side of the tube sheet 20. Therefore, direct welding of the tubes 10 to the outer side of the tube sheet 20 is desirable but, in order to weld a plurality of tubes 10 to the tube sheet 20, it is difficult to assure a space for access of the welding torch T to the tube sheets 20 and thereby regions in which welding is not possible are generated. That is, in order to directly weld the outer sides of the tubes 10 to the shell side of the tube sheet 20 using the welding torch T, welding of tubes 10 located at the edge region of the tube sheet 20 is possible but, when other adjacent tubes 10 or other tubes 10 located at the central region of the tube sheet 20 are welded to the tube sheet 20, interference between the tube 10 and the tube 10 occurs and thus welding is difficult, welding efficiency is lowered and complete welding operation is difficult.

As another prior art document (patent document 2), Korean Patent Laid-open Publication No. 10-2013-0081440 is described. That is, as exemplarily shown in FIG. 2, in order to prevent generation cracks and corrosion in tubes 10 due to permeation of a fluid at a shell side into gaps between tubes 10 and tube sheets 20, welding W is carried out by inserting a welding torch T into a tube 10 during shell side welding. The welding torch T is inserted into the tube 10, welding heat is first applied to the tube 10, i.e., a base material, and indirectly transmitted to a tube sheet lower end joint part 23 formed by a sheet groove 22 via the tube 10, thereby performing welding between the tube 10 and the tube sheet lower end joint part 23 of the tube sheet 20.

Figure 2:
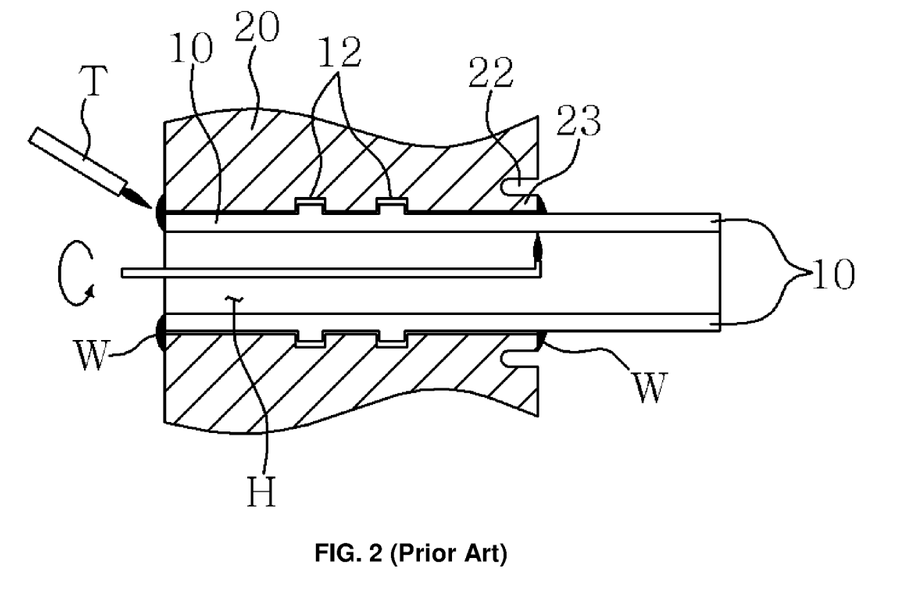
FIG. 2 is a cross-sectional view illustrating another conventional shell and tube welding method.

Here, the reason why the welding torch T is inserted into the tube 10 to perform welding is that, if a plurality of tubes 10 inserted into the tube sheet 20 is welded directly using the welding torch T at the outside of the shell side, it is difficult for the welding torch T to access a narrow space between the tube 10 and the tube 10 and, even if welding is carried out using the welding torch T, a defect may be generated and thus the welding torch T is inserted into the tube 10 to perform welding.

Further, welding between the tube sheets 20 and the inner sides of the tubes 10 and welding between the tube sheets 20 and outer sides of the tubes 10, i.e., tube side (outer side) welding and shell side (inner side) welding between the tube sheets 20 and the tubes 10, are respectively carried out and, here, any one of tube side (outer side) welding and shell side (inner side) welding may be carried out first.

In the prior art document shown in FIG. 2 (patent document 2), during shell side welding, the welding touch T is inserted into the tube 10 to perform welding under the condition that the tubes 10 are inserted into the tube sheets 20. However, since welding heat of the welding touch T is not directly transmitted to the tube sheet lower end joint part 23 of the tube sheet 20 welded to the outer circumferential surface of the tube 10 but welding heat is indirectly transmitted to the tube sheet lower end joint part of the tube sheet 20 via the tube 10, cracks in the tube 10 and welding defects may be generated due to a difficulty in accurate transmission of welding heat to the tube sheet lower end joint part 23, thus lowering productivity.

Further, in the above-described conventional prior arts, since the tube grooves 12 are formed on the tube sheets 20 and, when the tubes 10 are expanded, designated portions of the tubes 10 are inserted into the tube grooves 12 to increase combining force, the tubes grooves 12 should be separately formed on the tube sheets 20, a process of expanding the tubes 10 is required and, thus, manufacturing costs are increased.

In order to solve such problems, as yet another prior art document (patent document 3) filed by the applicant, Korean Patent Registration No. 10-1359778 entitled "Welding method of shell and tubes" is given. However, in addition to the above-described prior art documents, patent document 3 still has problems, such as no use of a welding rod caused by possibility of only welding between base materials due to a narrow spatial limitation, impossibility of acquiring the best weld quality, oxidization or nitrification and corrosion due to extended use.

SUMMARY OF THE INVENTION

Therefore, the present invention has been made in view of the above problems, and it is an object of the present invention to provide a shell and tube welding method in which a welding rod may be used so as to acquire the best weld quality and thus to overcome problems, such as oxidization or nitrification and corrosion due to extended use, differently from a conventional method having difficulty in use of a welding rod due to a narrow space limitation.

The objects of the present invention are not limited to the above-mentioned objects and other objects that have not been mentioned above will become evident to those skilled in the art from the following description.

In accordance with an aspect of the present invention, the above and other objects can be accomplished by the provision of a shell and tube welding method for welding tubes to tube insertion holes formed through tube sheets of a shell and tube heat exchanger configured such that different fluids are introduced into and discharged from a tube side and a shell side so as to exchange heat with each other, the shell and tube welding method including forming ring-shaped tube sheet grooves, spaced from the tube insertion holes by a designated distance in the outer circumferential direction, on one surface of the tube sheet at the shell side so as to form joint parts between the tube sheet grooves and the tube insertion holes, inserting tube joint members, having a cylindrical shape with a shorter length than the length of the tube insertion holes of the tube sheet and the same diameter as that of the tubes, into the tube insertion holes of the tube sheet, manufacturing ring wires by cutting a welding wire having a long length as a bare electrode into pieces having a designated length and bending the pieces into a ring shape having a greater diameter than the diameter of the tubes so as to be inserted into the outer circumferences of the tubes, inserting the ring wire into the outer circumference of one end of the tube, inserting the one end of the tube into the tube sheet in one direction such that the one end of the tube contacts one end of the tube joint member facing the one end of the tube and is located within the recessed distance range of the tube sheet groove simultaneously with contact of the ring wire with the joint part formed between the tube sheet groove and the tube insertion groove, performing tube side welding by welding the other end of the tube joint member to the other surface of the tube sheet at the tube side, and performing shell side welding by inserting a welding torch into the tube joint member and thus welding the one end of the tube joint member, the one end of the tube and the joint part to the one surface of the tube sheet at the shell side using the ring wire as a filler metal, wherein, in insertion of the tube joint members, the tube joint member is inserted into the tube insertion hole of the tube sheet such that the other end of the tube joint member is located on the other surface of the tube sheet at the tube side and the one end of the tube joint member is located within the recessed distance range of the tube sheet groove, and, in shell side welding, if the welding torch is inserted into the tube joint member under the condition that the one end of the tube joint member and the one end of the tube contact each other within the distance range of the tube sheet groove of the tube sheet, welding heat is directly transmitted to a contact region between the one end of the tube joint member and the one end of the tube and to the joint part of the tube sheet through a contact gap, the ring wire contacting the joint part of the tube sheet is melted and thus the one end of the tube joint member and the one end of the tube are welded to the joint part of the tube sheet using the ring wire as a filler metal.

In a shell and tube welding method in accordance with the present invention, under the condition that a tube joint member and a tube having the same diameter are inserted into each of tube insertion holes formed through tube sheets of a shell and tube heat exchanger and contact each other, a welding torch is inserted into the tube joint member to perform welding and, thus, the welding torch may easily approach targets for welding, and particularly, the targets for welding, i.e., the tube sheet, the tube joint member and the tube are simultaneously heated directly by welding heat from the welding torch and are welded using a wire ring as a filler metal, and thus precise welding may be carried out, the best weld quality may be acquired, and problems, such as oxidization or nitrification and corrosion due to extended use, may be overcome, so as to improve durability and reliability.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, with reference to the accompanying drawings, preferred embodiments of a shell and tube welding method in accordance with the present invention will be described in detail.

In a shell and tube welding method in accordance with the present invention, as exemplarily shown in FIGS. 3 to 9, a tube sheet 100 includes tube insertion holes 110, tube sheet grooves 120 and joint parts 130, and a tube joint member 200 and a tube 300 are inserted into the tube insertion hole 110 of the tube sheet 100 and combined with the tube sheet 100 by welding.

Figure 3:
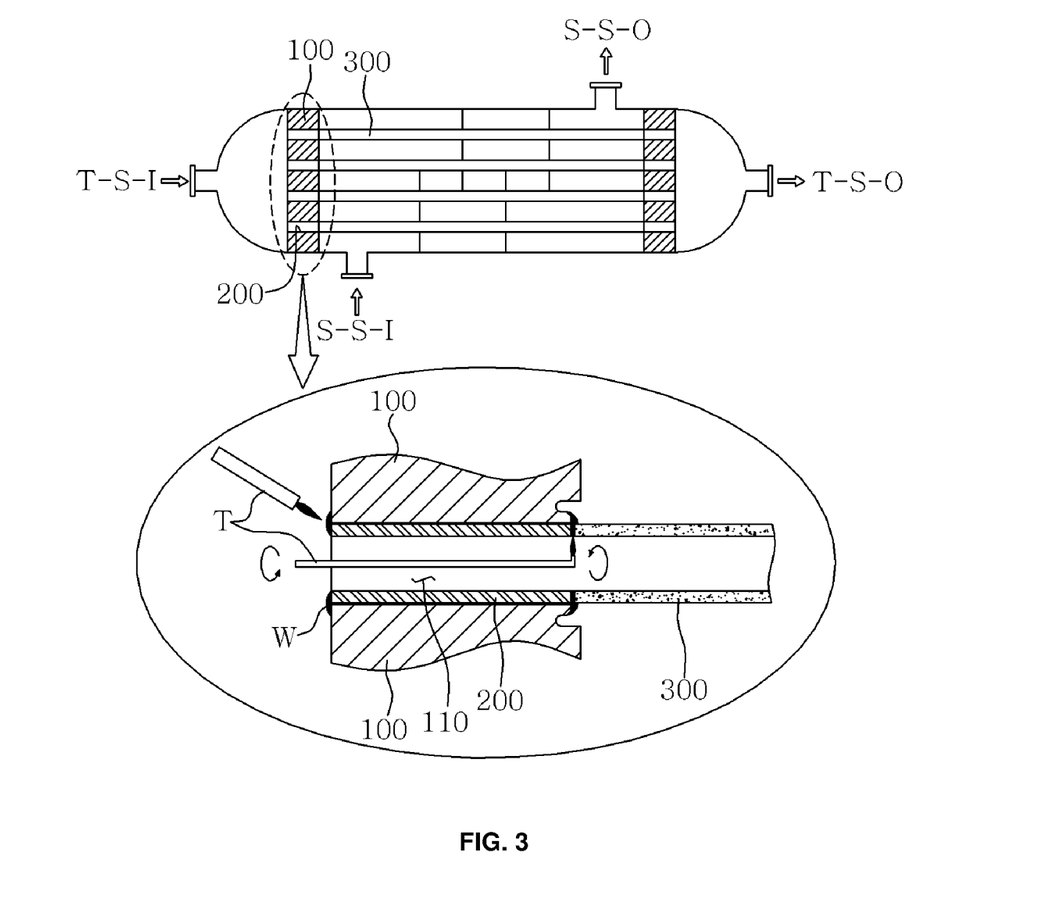
FIG. 3 is a view illustrating a shell and tube heat exchanger manufactured by a shell and tube welding method in accordance with the present invention.

A shell and tube heat exchanger, to which the shell and tube welding method in accordance with the present invention is applied, is configured such that different fluids are introduced into and discharged from a tube side and a shell side so as to exchange heat with each other, as exemplarily shown in FIG. 3. Since the tubes 300 passing through the inside of the shell side should be completely isolated from the inside of the shell side so as to prevent mixing of the different fluids at the shell side and the tube side, the tubes 300 are welded to a pair of tube sheets 100 symmetrically formed and facing each other so as to seal the tube side from the shell side.

As exemplarily shown in FIG. 3, the tube insertion holes 110 are formed through the tube sheets 100 and the tube sheet grooves 120 of a ring shape are spaced from the tube insertion holes 110 by a designated distance in the outer circumferential surface. Here, the separation distance of tube sheet groove 120 from the tube insertion hole 110 serves as the joint part 130, and the joint part 130 and one end of the tube 300 contacting one end of the tube joint member 200, which will be described later, are combined by welding.

The reason for formation of the ring-shaped tube sheet groove 120 spaced from the tube insertion hole 110 of the tube sheet 100 by a designated distance in the outer circumferential surface is that welding may be carried out by locally heating only the joint part 130 formed by the tube sheet groove 120 not by heating the entirety of the tube insertion hole 110 and thus consumption of heat required for welding may be reduced and welding efficiency may be increased. Further, since the thickness of the tubes 300 is about 1.6 mm, if the joints 130 formed between the tube insertion holes 110 and the tube sheet grooves 120 have the same thickness as the tubes 200, welding efficiency may be further increased.

The tube insertion holes 110 are formed so as to pass through one surface and the other surface of each of the tube sheets 100. Here, the one surface refers to the inner surface of each of the tube sheets 100 facing each other, i.e., the shell side, and the other surface refers to the outer surface of each of the tube sheets 100 opposite the inner surface, i.e., the tube side. Therefore, the tube sheet grooves 120 and the joint parts 130 are formed at the shell sides of the tube sheets 100.

Figure 4:
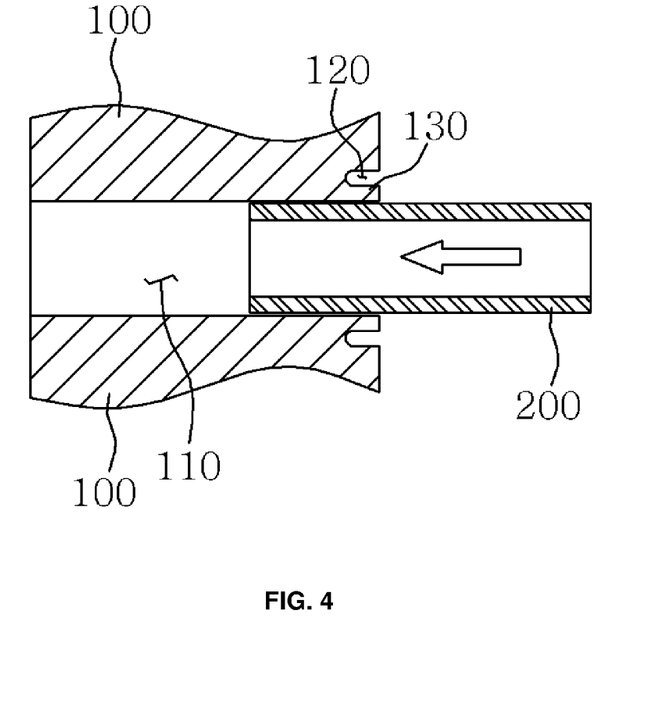
FIG. 4 is a cross-sectional view illustrating formation of tube sheet grooves and insertion of tube joint members in the welding method in accordance with the present invention.
Figure 6:
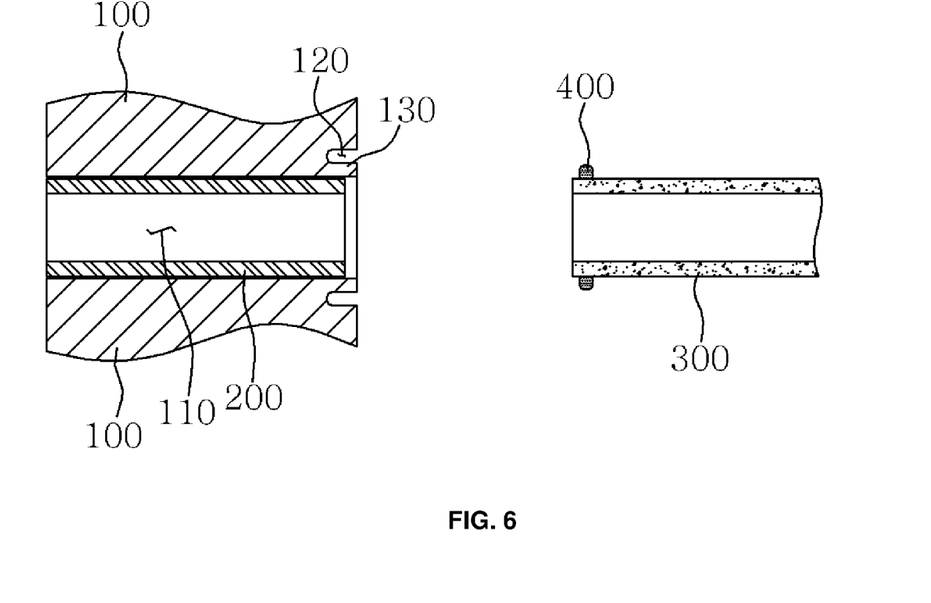
FIG. 6 is a cross-sectional view illustrating insertion of the ring wires in the welding method in accordance with the present invention.

The tube joint member 200 having a cylindrical shape with the same diameter as that of the tubes 300 is inserted into the tube insertion hole 110 of the tube sheet 100, as exemplarily shown in FIGS. 3, 4 and 6. One end of the tube joint member 200 inserted into the tube insertion hole 110 is located at the shell side (one side), i.e., the inner side of each of the tube sheets 100 facing each other, and the other end of the tube joint member 200 is located at the tube side (the other side), i.e., the outer side of each of the tube sheets 100 opposite the inner side.

Here, only if one end of the tube joint member 200 and one end of the tube 300 contact within a length of the joint part 130, which is a recessed distance of the tube sheet groove 120 spaced from the tube insertion hole 110 of the tube sheet 100, the tube joint member 200 and the tube 300 may be welded to the joint part 130 using a welding torch T, which will be described later. Therefore, the length of the tube joint member 200 may be set to be smaller than the length of the tube insertion hole 110 of the tube sheet 100. That is, the tube joint member 200 is configured such that one end of the tube joint member 200 contacts one end of the tube 300 and is located within the recessed distance range of the tube sheet groove 120 and the other end of the tube joint member 200 coincides with the other end of the tube insertion hole 110.

The tubes 300 are welded to a pair of tube sheets 100, which are symmetrically formed so as to face each other, pass through the inside of the shell side of the heat exchanger, and are sealed so as to be completely isolated from the inside of the shell side, as exemplarily shown in FIGS. 3, 4 and 6 to 12, thus preventing mixing of the different fluids at the shell side and the tube side. One end of the tube 300 is inserted into the tube insertion hole 110 of the tube sheet 100 such that the one end of the tube 300 contacts one end of the tube joint member 200 and is located within the recessed distance range of the tube sheet groove 120, and the one end of the tube 300, the one end of the tube joint member 200 and the joint part 130 of the tube sheet 100 are combined by welding using the welding torch T, which will be described later.

Figure 8:
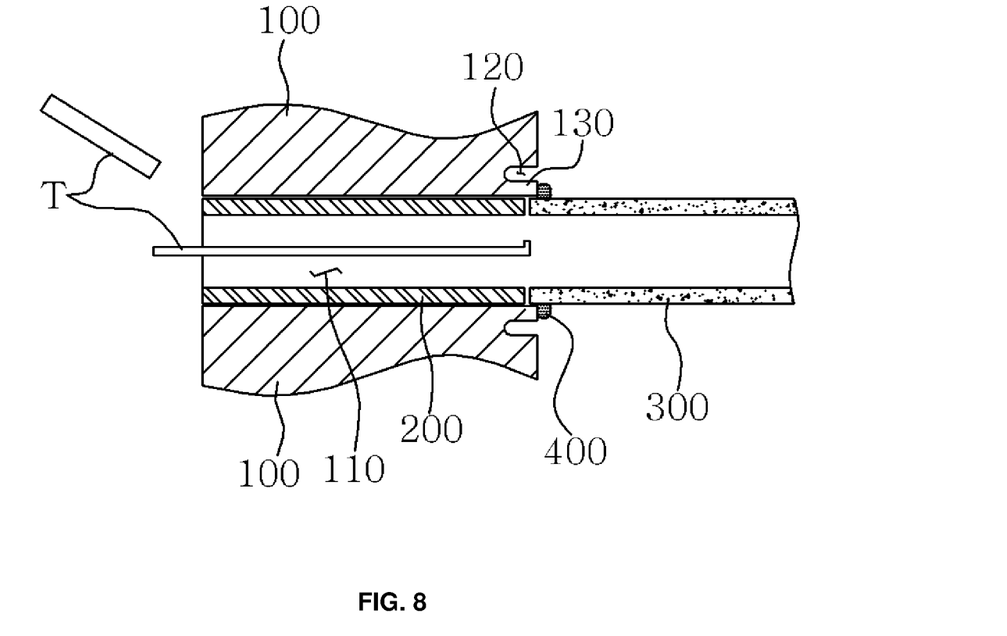
FIG. 8 is a cross-sectional view illustrating an inserted state of a welding torch into the tube joint member in the welding method in accordance with the present invention.
Figure 9:
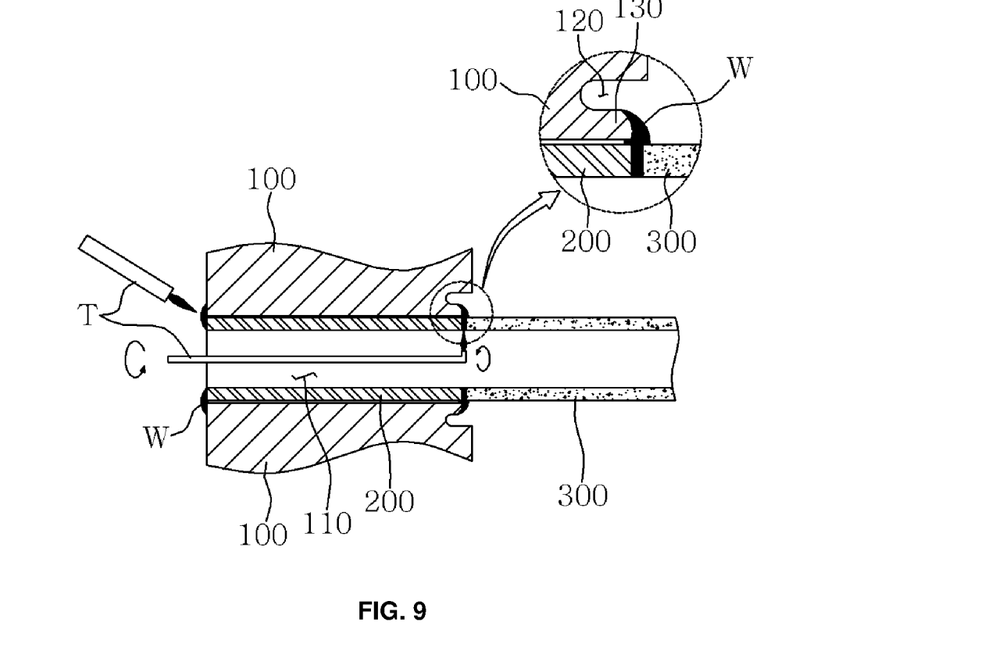
FIG. 9 is a cross-sectional view illustrating a welded state of a tube side and a shell side using the welding torch in the embodiment of FIG. 8.
Figure 10:
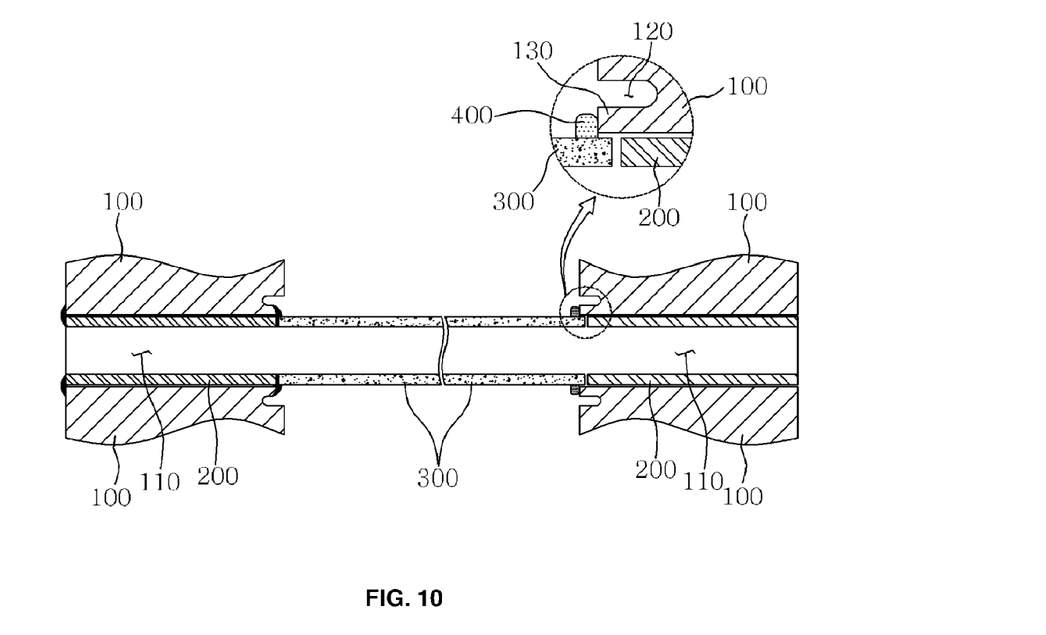
FIGS. 10 to 12 are cross-sectional views illustrating a process of welding a tube side and a shell side of an opposite tube sheet in the embodiment of FIG. 3.
Figure 11:
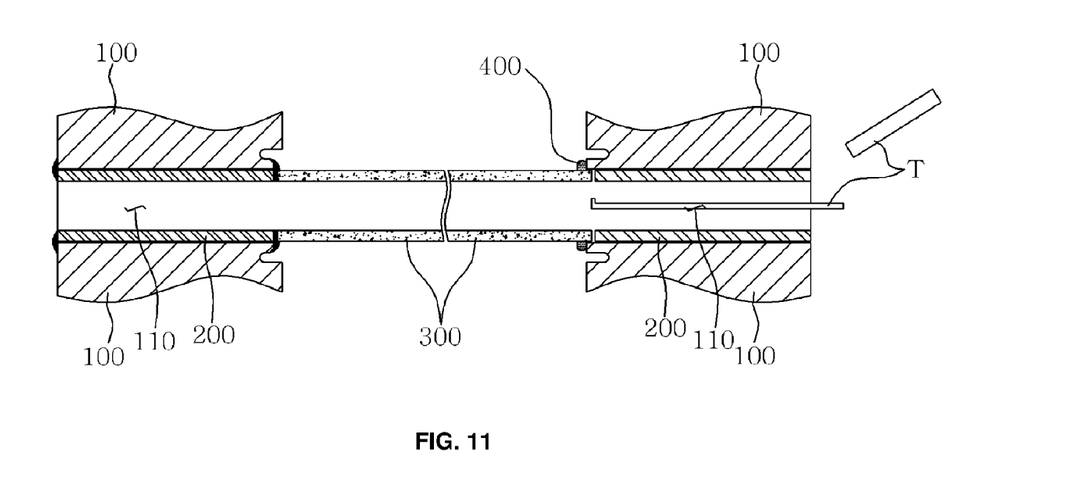
Figure 12:
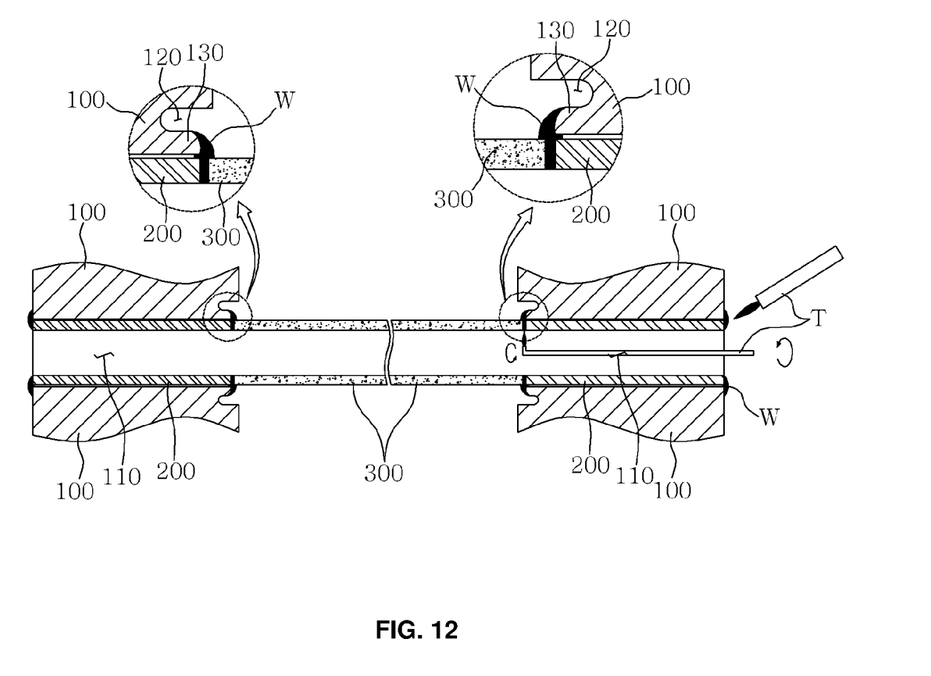

Further, since the tubes 300 are welded to a pair of tube sheets 100 which are symmetrically formed so as to face each other, the tubes 300 are first welded to one tube sheet 100, as exemplarily shown in FIGS. 3, 4 and 5 to 9, and are then welded to the other tube sheet 100 through the same method, as exemplarily shown in FIGS. 10 to 12.

Here, when the tube joint member 200, the joint part 130 of the tube sheet 100 and the tube 300 are welded, if only base materials are welded, the best weld quality may not be acquired and problems, such as oxidization or nitrification and corrosion due to extended use, may be caused. In order to overcome such problems, the shell and tube welding method in accordance with the present invention may provide a new method in which a filler metal may be used during shell and tube welding even in a narrow space. That is, as exemplarily shown in FIGS. 5 to 9, the ring wires 400 are used.

Figure 5:
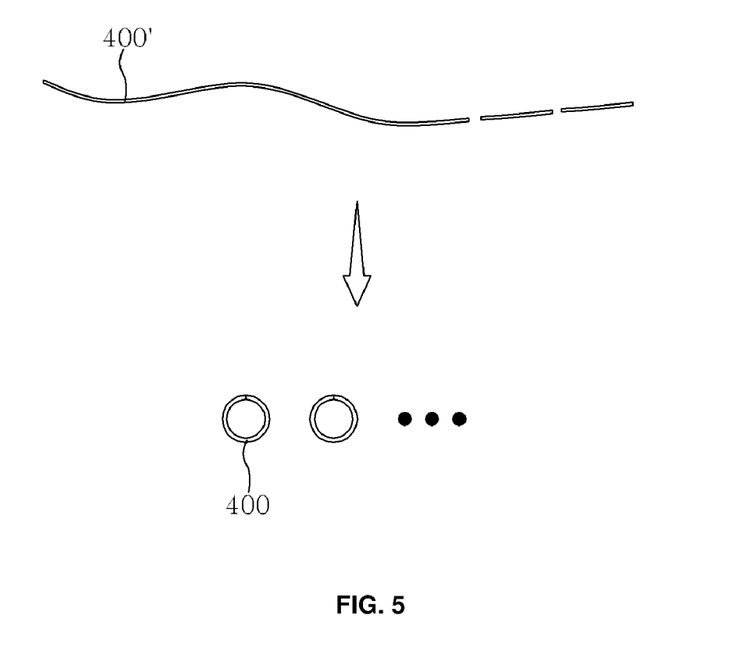
FIG. 5 is a view illustrating manufacture of ring wires in the welding method in accordance with the present invention.

A plurality of ring wires 400 is provided, as exemplarily shown in FIG. 5, the ring wires 400 are manufactured by cutting a welding wire 400' having a long length into pieces having a designated length and then bending the pieces into a ring shape. The welding wire 400' is a bare electrode, i.e., an uncoated welding rod, and a large number of ring wires 400 is manufactured in advance by unwinding the welding wire 400' from a reel (not shown) and cutting the unwound welding wires 400' into pieces of a designated length. The manufactured ring wire 400 is inserted into the outer circumference of one end of the tube 300 before insertion of the tube 300 into the tube insertion hole 110 of the tube sheet 100, as exemplarily shown in FIG. 6. Thereafter, when the tube 300 is inserted into the tube insertion hole 110 of the tube sheet 100, the ring wire 400 contacts the joint part 130, as exemplarily shown in FIGS. 7 and 8.

Thereby, as exemplarily shown in FIGS. 8 and 9, one end of the tube 300 is inserted into the tube insertion hole 110 of the tube sheet 100 so as to contact one end of the tube joint member 200 and simultaneously to be located within the recessed distance range of the tube sheet groove 120, and the one end of the tube 300, the one end of the tube joint member 200 and the joint part 130 of the tube sheet 100 are welded together by the welding torch T using the ring wire 400 as a filler metal.

Further, since the tubes 300 are welded to a pair of tube sheets 100 which are symmetrically formed so as to face each other, the tubes 300 are first welded to one tube sheet 100, as exemplarily shown in FIGS. 3 to 9, and are then welded to the other tube sheet 100 through the same method using the ring wires 400 as the filler metal, as exemplarily shown in FIGS. 10 to 12

As described above, in the shell and tube welding method in accordance with the present invention, the welding torch T is inserted into the tube joint member 200 to perform welding under the condition that the tube joint member 200 and the tube 300 having the same diameter are inserted into the tube insertion hole 110 formed through the tube sheet 100 and contact each other, and thus the welding torch T may easily approach targets for welding, and particularly, the targets for welding, i.e., the tube sheet 100, the tube joint member 200 and the tube 300 are simultaneously heated directly by welding heat applied from the welding torch T and are welded and thus precise welding may be carried out, the best weld quality may be acquired, and problems, such as oxidization or nitrification and corrosion due to extended use, may be overcome, thereby improving durability and reliability.

Here, when the welding torch T is inserted into the tube joint member 200 to apply welding heat under the condition that one end of the tube 300 and one end of the tube joint member 200 contact within the recessed distance range of the tube sheet groove 120, the welding heat is transmitted directly not only to a contact region between the one end of the tube joint member 200 and the one end of the tube 300 but also to the joint part 130 of the tube sheet 100 formed by the tube sheet groove 120 through a contact gap, the one end of the tube joint member 200 and the one end of the tube 300 are welded to the joint part 130 of the tube sheet 100 and, simultaneously, the wire ring 40 is melted and thus forms a weld metal after welding, as exemplarily shown in FIG. 9.

Hereinafter, the shell and tube welding method in accordance with the present invention will be described in detail with reference to the accompanying drawings.

As exemplarily shown in FIG. 4, tube insertion holes 110 are first formed through a tube sheet 100 and ring-shaped tube sheet grooves 120 spaced from the tube insertion holes 110 by a designated distance in the outer circumferential direction are formed on one surface of the tube sheet 100.

In such tube sheet groove formation, the separation distance from the tube sheet grooves 120 from the tube insertion holes 110 becomes the thickness of the joint parts 130 and the recessed distance of the tube sheet grooves 120 becomes the length of the joint parts 130. The joint part 130 of the tube sheet 100 is welded to one end of the tube joint member 200 and one end of the tube 300, which will be described later, by the welding torch T using the wire ring 400 as a filler metal.

Thereafter, as exemplarily shown in FIG. 4, the tube joint member 200 having a cylindrical shape with the same diameter as that of the tube 300 is inserted into the tube insertion hole 110 of the tube sheet 100.

Thereafter, as exemplarily shown in FIG. 5, wires 400 having a ring shape to be inserted into the outer circumferences of the tubes 300 are manufactured by cutting a welding wire 400' having a long length into pieces of a designated length and then bending the pieces into a ring shape. Although ring wire manufacturing is carried out after tube joint member insertion in this process, a large number of ring wires 400 may be manufactured any time regardless of a sequence of operations.

The manufactured ring wire 400 is inserted into the outer circumference of one end of the tube 300, as exemplarily shown in FIG. 6.

Figure 7:
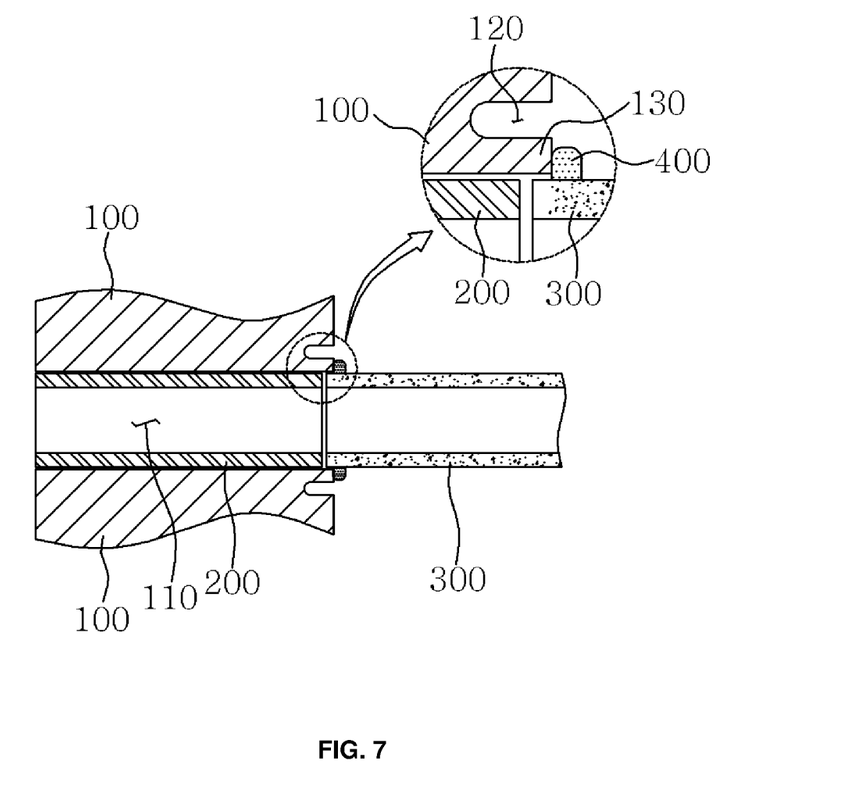
FIG. 7 is a cross-sectional view illustrating insertion of the tubes in the welding method in accordance with the present invention.

Thereafter, as exemplarily shown in FIG. 7, the one end of the tube 300 is inserted into the tube sheet 100 in one direction such that the one end of the tube 300 provided with the ring wire 400 contacts one end of the tube joint member 200 facing the one end of the tube 300 and is located within the recessed distance range of the tube sheet groove 120. Here, the ring wire 400 is in the contact state with the joint part 130 of the tube sheet 100.

In tube joint member insertion and tube insertion, since the recessed distance range of the tube sheet groove 120 is a range welded by the welding torch T, if one end of the tube joint member 200 and one end of the tube 300 are inserted into the tube insertion hole 110 and contact within the recessed distance range of the tube sheet groove 120 spaced from the tube insertion hole 110 of the tube sheet 100, the joint part 130 formed by the tube sheet groove 120, the one end of the tube joint member 200 and the one end of the tube 300 are welded together by welding heat of the welding torch T inserted into the tube joint member 200 using the ring wire 400 as a filler metal.

Thereafter, as exemplarily shown in FIGS. 8 and 9, tube side welding, in which the other end of the tube joint member 200 is welded to the other surface of the tube sheet 100, and shell side welding, in which the welding torch T is inserted into the tube joint member 200 and thus one end of the tube joint member 200 and one end of the tube 300 are welded to one surface of the tube sheet 100 using the ring wire 400 as a filler metal, are carried out. Here, any one of tube side welding and shell side welding may be carried out first.

Further, as exemplarily shown in FIGS. 8 and 9, in shell side welding, the welding torch T is inserted into the tube joint member 200 through the other end of the tube joint member 200 inserted into the tube insertion hole 110 of the tube sheet 100. Although the welding torch T may be inserted into the tube joint member 200 through the other end of the tube 300 contacting the one end of the tube joint member 200, in this case, the welding torch T should be inserted to a distance corresponding to the length of the tube 300, the insertion length of the welding torch T is excessively increased and, thus, the welding torch T may be inserted into the tube joint member 200 through the other end of the tube joint member 200.

The above description with reference to FIGS. 4 to 9 relates to welding of the tubes 300 to one of a pair of tube sheets 100 installed in the shell and tube heat exchanger, and the tubes 300 may be welded to the other one of the tube sheets 100 through the same method, as exemplarily shown in FIGS. 10 to 12.

FIG. 10 illustrates formation of the tube insertion holes 110 and the tube sheet grooves 120 on the other tube sheet 100 and insertion of the tube joint member 200 into the tube insertion hole 110. FIG. 11 illustrates the inserted state of the welding torch T into the tube joint member 200 and, in shell side welding, the welding torch T may be inserted into the tube joint member 200 through the other end of the tube joint member 200 inserted into the tube insertion hole 110 of the tube sheet 100, i.e., through an end having a shorter insertion distance of the welding torch T. FIG. 12 illustrates tube side welding and shell side welding by the welding torch T, and any one of tube side welding and shell side welding may be carried out first.

A welded state using the shell and tube welding method in accordance with the present invention is indicated by a welding side W and is substantially shown in FIG. 9. That is, as exemplarily shown in FIG. 9, differently from conventional welding of only base materials due to a narrow spatial limitation, welding may be carried out using ring wires 400 as a filler metal in addition to base materials and, thus, the best weld quality may be acquired, and problems, such as oxidization or nitrification and corrosion due to extended use, may be overcome, thereby improving durability and reliability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present invention is applicable to a shell and tube heat exchanger in which targets for welding, i.e., a tube sheet, a tube joint member and a tube may be simultaneously heated directly by welding heat from a welding torch and welded using a wire ring as a filler metal, and thus precise welding may be carried out, the best weld quality may be acquired, and problems, such as oxidization or nitrification and corrosion due to extended use, may be overcome, so as to improve durability and reliability.

What is claimed is:

1. A method for welding tubes to tube insertion holes formed in tube sheets of a shell and tube heat exchanger, the shell and tube heat exchanger being configured such that different fluids are introduced into and discharged from a tube side and a shell side so as to exchange heat with each other, the method comprising:

forming ring-shaped tube sheet grooves, spaced from the tube insertion holes by a designated distance in the outer circumferential direction, on a first face surface of the tube sheet at the shell side so as to form joint parts between the tube sheet grooves and the tube insertion holes;

inserting tube joint members, having a cylindrical shape with a shorter length than the length of the tube insertion holes of the tube sheet and the same diameter as that of the tubes, into the tube insertion holes of the tube sheet;

producing ring wires by cutting a welding wire having a long length into pieces having a designated length and bending the pieces into a ring shape having a greater diameter than the diameter of the tubes so as to be affixed to the outer circumferences of the tubes;

affixing the ring wire to the outer circumference of a first end of the tube;

inserting the first end of the tube into the tube sheet in a manner such that the first end of the tube contacts a first end of the tube joint member facing the first end of the tube and that the contact area of the first end of the tube and the first end of the tube joint member is located within a recessed distance range of the tube sheet groove with the ring wire affixed to the first end of the tube simultaneously contacting to the joint part formed between the tube sheet groove and the tube insertion hole;

performing tube side welding by welding a second end of the tube joint member to a second face surface of the tube sheet at the tube side; and performing shell side welding by inserting a welding torch into the tube joint member and welding the first end of the tube joint member, the first end of the tube and the corresponding joint part to the first face surface of the tube sheet at the shell side using the ring wire as a filler metal, wherein in inserting the tube joint members, the tube joint member is inserted into the tube insertion hole of the tube sheet such that the second end of the tube joint member is generally aligned with the second face surface of the tube sheet at the tube side and the first end of the tube joint member is located within the recessed distance range of the tube sheet groove, and in shell side welding, when the welding torch is inserted into the tube joint member under the condition that the corresponding ends of the tube joint member and the tube contact each other within the recessed distance range of the tube sheet groove of the tube sheet, welding heat is directly transmitted to a contact region between the corresponding ends of the tube joint member and the tube and to the corresponding joint part of the tube sheet through a contact gap there-between, such that the ring wire contacting the joint part of the tube sheet is melted and thus the ends of the contacting tube joint member and the contacting tube are welded to the joint part of the tube sheet using the ring wire as the filler metal.

\* \* \* \* \*